United States Patent [19]
Voss

[11] Patent Number: 6,016,645
[45] Date of Patent: Jan. 25, 2000

[54] WINDROW DEFLECTOR PLATE FOR A ROUND BALER

[76] Inventor: Donald Voss, Rural Route 1, Spiritwood, Saskatchewan, Canada, S0J 2M0

[21] Appl. No.: 09/076,318

[22] Filed: May 11, 1998

[51] Int. Cl.[7] .............................. A01D 39/00; B30B 5/06
[52] U.S. Cl. ................................................ 56/341; 100/88
[58] Field of Search ............................ 56/131, 341, 344, 56/345, 192, DIG. 24, 16.5; 100/74, 88, 174

[56] References Cited

U.S. PATENT DOCUMENTS

| | | | |
|---|---|---|---|
| 4,176,596 | 12/1979 | Sacht ........................................ | 100/88 |
| 4,241,474 | 12/1980 | Doutre ................................. | 56/16.5 X |
| 4,244,166 | 1/1981 | Hayward ................................. | 56/341 |
| 4,436,027 | 3/1984 | Freimuth et al. ..................... | 56/341 X |

Primary Examiner—Thomas B. Will
Assistant Examiner—Robert Pezzuto
Attorney, Agent, or Firm—Furman & Kalio

[57] ABSTRACT

The invention provides an improvement to the feed path for conventional round balers in the agricultural industry, and reduces the jamming of baling material in the feed gap of the baler. In a commonly known round baler the baling material enters the bale forming chamber through a feed gap defined by an upper roller rotating away from the bale forming chamber, and a lower roller rotating towards the bale forming chamber. As the upper roller is moving counter to the flow of baling material into the bale forming chamber, baling material which contacts it is retarded, and tends to form a ball of material which can plug the feed gap. The present invention provides a plate covering the upper roller which plate deflects the baling material into the feed gap and prevents the baling material from contacting the upper roller. The invention could be provided as an integral flange manufactured in new balers, or could be produced as a mountable plate for retrofitting of existing equipment.

8 Claims, 2 Drawing Sheets

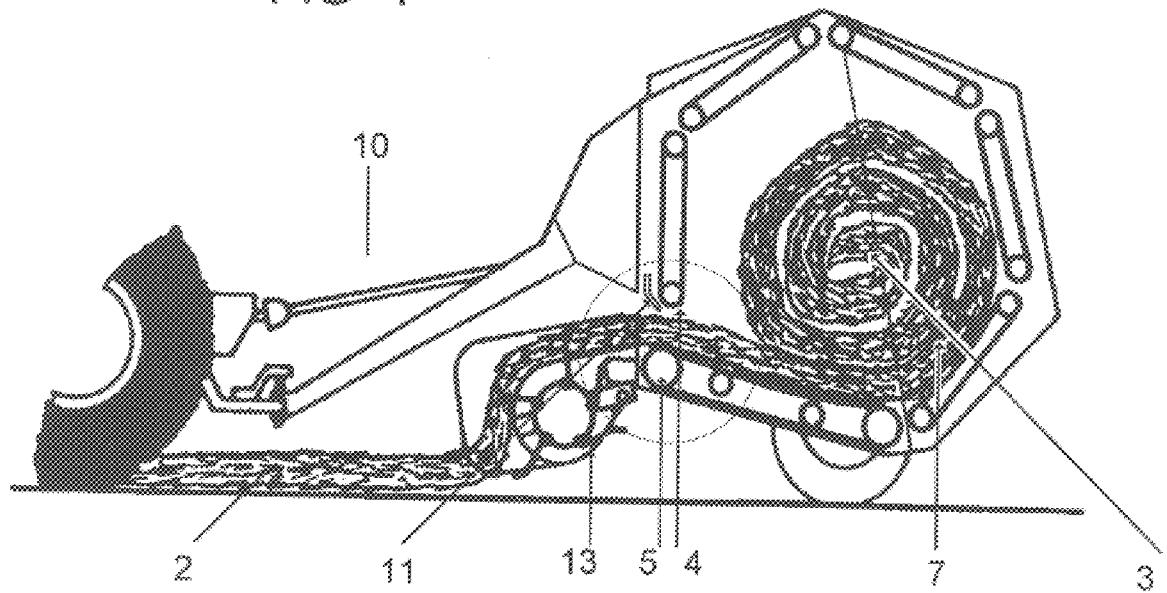
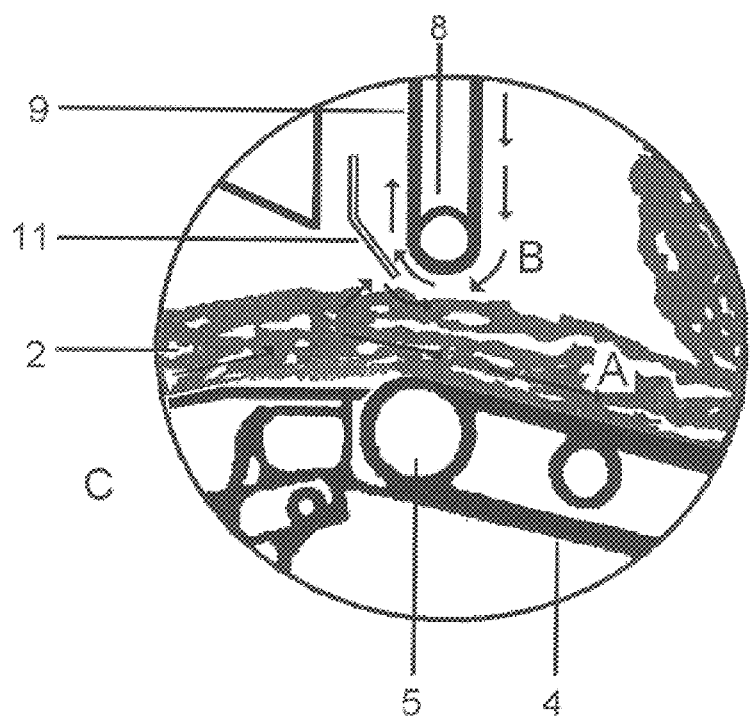

WINDROW DEFLECTOR PLATE FOR A ROUND BALER

This invention deals with the field of round balers for agricultural use, and in particular improvements in the feeding of baling material into the bale forming chambers thereof.

BACKGROUND

The process of harvesting hay and straw begins by cutting the crop and laying it in a windrow. Various baling machinery is then used to gather and bundle the hay or straw for transport and storage. The round baler pulled behind a farm tractor has become the predominant agricultural method of baling hay and straw due to the ease in mechanized handling of round bales. It has replaced the older square baler which produced small bales which were most often handled manually.

Round balers are equipped with a pickup comprising rotating teeth which pick the windrow up and deliver it through a feed gap to the bale forming chamber. Most round balers are designed so that the feed gap through which the baling material enters the bale forming chamber is defined on the bottom by the top of a lower roller, which is rotating towards the rear of the baler and into the bale forming chamber, and on the top by the bottom of an upper roller rotating away from said chamber towards the front of the baler. This design is necessitated by the need to have the baling material traveling in the proper direction around the circumference of the bale forming chamber to form a bale.

Within the bale forming chamber there are bale forming means. Some round balers use belts traveling around the chamber as the bale forming means. Others use chains or rollers. In most cases, however, there is an upper and a lower roller defining the feed gap into the bale forming chamber.

As the baling material travels through the feed gap the bottom roller moves it into the bale forming chamber. In larger windrows the top of the windrow often contacts the upper roller which, because of its counter-rotation, tends to push the baling material away from the chamber and so retards the even flow of material. The result is often a plugged feed gap as the material is pulled in opposite directions.

To unplug the feed gap, operators commonly use a stick or prod to reach over the pickup and push the material through the feed gap and into the bale forming chamber. This is most often done while the baler is under power with the power take off shaft, pickup, rollers and bale forming means moving because then only a slight push is needed to overcome the counter-rotating force of the upper roller, and the material is carried into the bale forming chamber by the motion of the bottom roller. This puts the operator in the dangerous position of being in close proximity to the fast moving parts of the baler, and in contact with some of these fast moving parts through the stick or prod. Accidents are not uncommon, often resulting in loss of limbs and other very serious injuries.

In the busy baling season, frequent plugging of the feed gap can be very tiring and frustrating as the operator must stop the forward motion of the tractor, climb down from it, locate his stick or prod and push the material through the feed gap. This repeated process can easily lead to carelessness and hurry on the operator's part, and increase the chances of an accident. The frequency of such plugging of the feed gap varies greatly with conditions, but in some conditions the frequency can make it almost impossible to continue with the baling operation.

This problem has existed in balers manufactured by many different companies since such round balers were first introduced. The problem is more or less pronounced depending upon the size of the feed gap on the various balers, however in all round balers where the feed gap is defined by such counter-rotating rollers, the problem exists to some extent. No prior art has addressed this problem. The solution provided by the present invention is simple, and while it does not entirely eliminate plugging of the feed gap, such plugging is greatly reduced.

SUMMARY OF THE INVENTION

It is the object of the present invention to provide, in commonly found round balers, a modification to the upper definition of the feed gap so as to prevent the top of the windrow from contacting the upper roller as it enters the bale forming chamber.

The invention, a windrow deflector [plate] device, accomplishes these objects in a conventional round baler used in the baling of forage crops and other [baling] crop material, said baler comprising substantially a pick-up; a bale forming chamber; a feed gap through which the baling material enters the baling chamber, said feed gap having a top edge and a bottom edge; a lower roller, said lower roller defining the bottom edge of the feed gap; an upper roller, said upper roller defining the top edge of the feed gap; bale forming means; and bale tying and dumping means; where in operation of the baler the top of said lower roller is rotating in a direction towards the rear of the baler and the bottom of said upper roller is rotating in a direction towards the front of the baler, the windrow deflector [plate] device comprising a plate having [two] first and second opposite long sides and [two] first and second opposite short sides, said plate attached to the baler such that the edge of the first long side is substantially parallel to said upper roller and located vertically at or below, and in proximity to the bottom of said upper roller and horizontally in proximity to the upper roller, and such that the edge of the second long side is located forward of and above the edge of said first long side; wherein said first long side of said plate extends substantially the length of said upper roller; and whereby [baling] crop material entering said feed gap is deflected down and through said feed gap, and contact of said [baling] crop material with said upper roller is inhibited.

The invention may be practiced on round balers wherein the bale forming means are rollers alone or rollers carrying belts or chains.

The invention can either be implemented by baler manufacturers, by designing the windrow deflector [plate or flange] device into their balers at the point of manufacture, or the windrow deflector [plate] device itself could be sold in a kit with the proper mounting hardware and farmers or implement dealers could then retrofit existing round balers. Such a kit could incorporate a mounting flange fixed to the long side of the plate that is farther ahead of and above the opposite long side, such a configuration allowing easy installation to most known balers.

Reducing the frequency of plugging reduces the chance of injuries, and makes for a safer baler to operate. The baler is also more efficient and the operation takes much less time.

Feed rates may be increased because the operator is not slowing down to avoid plugging.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 4 is a plane side view of the embodiment as mounted on a round baler;

FIG. 5 is an enlargement of a portion of FIG. 4 showing the position of the embodiment relative to the parts of the baler.

DETAILED DESCRIPTION OF THE ILLUSTRATED EMBODIMENTS

[In one embodiment the invention is a windrow deflector plate, being an improvement to a conventional round baler used in the baling of forage crops and other baling material, said baler comprising substantially a pick-up; a bale forming chamber; a feed gap through which the baling material enters the baling chamber, said feed gap having a top edge and a bottom edge; a lower roller, said lower roller defining the bottom edge of the feed gap; an upper roller, said upper roller defining the top edge of the feed gap; bale forming means; and bale tying and dumping means; where in operation of the baler the top of said lower roller is rotating in a direction towards the rear of the baler and the bottom of said upper roller is rotating in a direction towards the front of the baler, the windrow deflector plate comprising a plate having two opposite long sides and two opposite short sides, said plate attached to the baler such that the edge of said first long side is substantially parallel to said upper roller and located vertically at or below the bottom of said upper roller and horizontally in proximity to the upper roller, and such that the opposite edge of the second long side is located forward of and above the edge of said first long side; wherein said first long side of said plate extends substantially the length of said upper roller; and whereby baling material entering said feed gap is deflected down and through said feed gap, and contact of said baling material with said upper roller is inhibited.]

Figure 1:
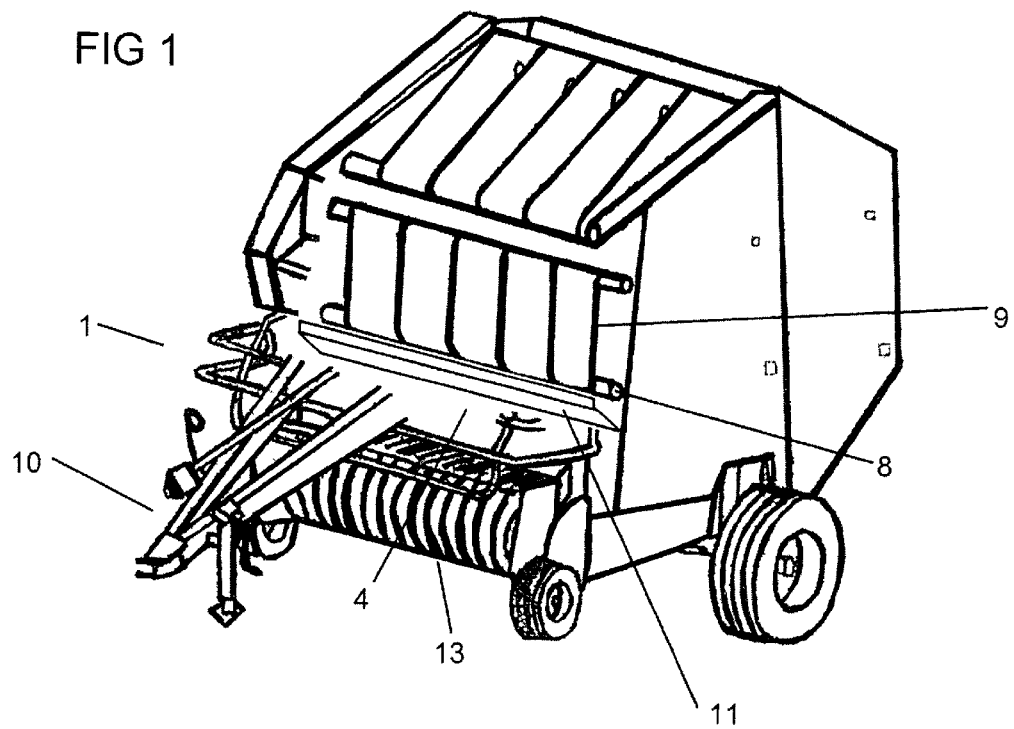
FIG. 1 is a perspective view of an embodiment of the windrow deflector [plate] device as mounted on a round baler.
Figure 2:
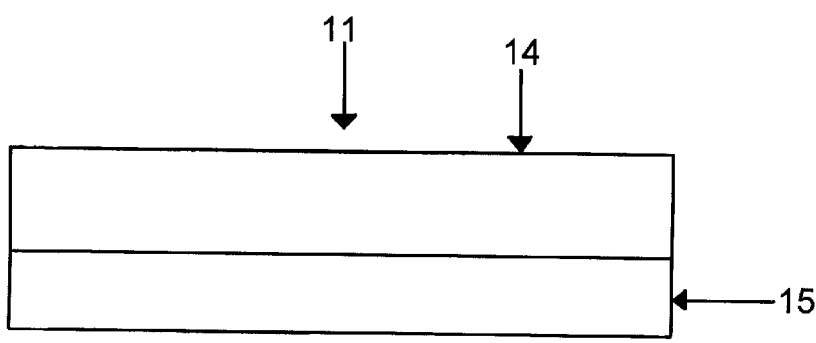
FIG. 2 is a plane front view of the embodiment.
Figure 3:
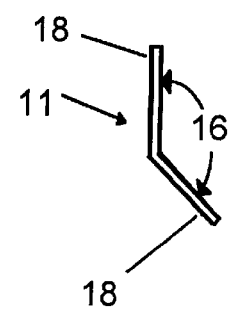
FIG. 3 is a plane side view of the embodiment.

FIG. 1 shows one preferred embodiment of the invention. The embodiment is attached to a commonly known round baler 1 wherein the [baling] crop material 2 is picked up from the ground by a pickup 13 and directed to the bale forming chamber 3 through a feed gap 4 defined on the bottom by the top of a lower roller 5, carrying belts 6 approximately horizontally towards the rear of the bale chamber 7, direction as indicated by arrow A and on the top by an upper roller 8, carrying belts 9 in an approximately vertical direction such that the bottom edge of said upper roller 8 is moving towards the front of the baler 10, direction as indicated by arrows B, opposite to the direction of travel of the [baling] crop material 2 into the bale forming chamber, direction as indicated by arrows C.

The windrow deflector plate comprises a substantially rectangular member 11 with a longer dimension 14 and a shorter dimension 15, said member being bent along its longer dimension at a deflection angle 16 to form an attachment flange 17 and a deflector plate 18, said longer dimension 14 being substantially the same length as the length of the upper roller 8 along its rotational axis. The member 11 is attached to the baler by the fastening of the attachment flange 17 at a point on the baler frame 12 above the top of the feed gap 4 forward of the upper roller 8 such that the longer dimension of the member 14 is parallel to the rotational axis of the upper roller 8, and wherein the deflection angle 16 is such that in combination with the attachment of the attachment flange 17 above the feed gap 4 the deflector plate 18 extends downward and angles back toward the rear of the baler, relative to the feed gap 4, to a point vertically at or below the bottom of the upper roller 8, and in proximity thereto. The deflector plate 18 becomes the new upper definition of the feed gap 4 or is coincidental with same, and the deflector plate 18 then covers the upper roller 8, preventing incoming [baling] crop material 2 from coming into contact with said upper roller 8 and deflecting said material 2 into the feed gap 4.

The attachment shown is the preferred method of mounting the deflector plate as experience has shown that an attachment flange is easily attached to most existing balers. It is easily seen that there would be other suitable methods of mounting the deflector plate with brackets and so forth attached to convenient locations on the baler and the ends or back-side of the deflector plate, and such mounting means are contemplated to fall within the scope of the present invention.

The windrow deflector plate, along with its attachment means/mounting hardware, could be packaged in a kit for sale and use by farmers or implement dealers to retrofit existing baling equipment.

In similar vein, it is also contemplated that the windrow deflector plate could be manufactured with adaptable attachment means so that said attachment means could be adjusted and fitted onto any number of different balers The invention could also be practiced as a windrow deflector flange, integrally incorporated into a baler at manufacture.

In the preferred embodiment the deflector plate 18 covers substantially the whole length of the upper roller 8. Since most material is fed into the center of the feed gap 4, it is contemplated that some small length of upper roller 8 at each end thereof could be left uncovered while still achieving an improvement in feeding.

Since numerous changes and modifications will readily occur to those skilled in the art, it is not desired to limit the invention to the exact construction and operation shown and described, and accordingly all such suitable changes or modifications in structure or operation which may be resorted to are intended to fall within the scope of the claimed invention.

I claim:

1. A windrow deflector device for attachment to a conventional round baler used in the baling of forage crops and other crop material, said baler comprising substantially a pick-up; a bale forming chamber; a feed gap through which the baling material enters the baling chamber, said feed gap having a top edge and a bottom edge; a lower roller, said lower roller defining the bottom edge of the feed gap; an upper roller, said upper roller defining the top edge of the feed gap; bale forming means; and bale tying and dumping means; where in operation of the baler the top of said lower roller is rotating in a direction towards the rear of the baler and the bottom of said upper roller is rotating in a direction towards the front of the baler, the windrow deflector device comprising:

a plate having first and second opposite long sides and first and second opposite short sides, said plate attached to the baler such that the edge of the first long side is substantially parallel to said upper roller and located vertically at or below, and in proximity to, the bottom of said upper roller and horizontally in proximity to the upper roller, and such that the edge of the second long side is located forward of and above the edge of said first long side;

wherein said first long side of said plate extends substantially the length of said upper roller; and whereby crop material entering said feed gap is deflected down and through said feed gap, and contact of said crop material with said upper roller is inhibited.

2. The windrow deflector device of claim 1 wherein said plate and means to attach said plate are provided in kit form for installation on existing balers.

3. The windrow deflector device of claim 2 wherein said plate further comprises a mounting flange fixed to the edge of said second long side, said mounting flange attachable to a baler.

4. The windrow deflector device of claim 3 wherein the attachment means are adjustable to fit a number of different balers.

5. The windrow deflector device of claim 1 used on a round baler wherein said upper roller and said lower roller also carry belts, which are part of said bale forming means.

6. The windrow deflector device of claim 1 used on a round baler wherein said upper roller and said lower roller also carry chains, which are part of said bale forming means.

7. The windrow deflector device of claim 2 used on a round baler wherein said upper roller and said lower roller also carry belts, which are part of said bale forming means.

8. The windrow deflector device of claim 2 used on a round baler wherein said upper roller and said lower roller also carry chains, which are part of said bale forming means.

* * * * *